United States Patent
Julia et al.

(10) Patent No.: US 9,247,110 B2
(45) Date of Patent: *Jan. 26, 2016

(54) SYSTEM AND METHOD FOR REMOTELY MONITORING AND/OR VIEWING IMAGES FROM A CAMERA OR VIDEO DEVICE

(71) Applicant: QUALCOMM Incorporated, San Diego, CA (US)

(72) Inventors: Luc Julia, Palo Alto, CA (US); Makhlouf Serghine, Newark, CA (US); Yohan Le Nerriec, San Francisco, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 14/268,889

(22) Filed: May 2, 2014

(65) Prior Publication Data

US 2014/0240524 A1 Aug. 28, 2014

Related U.S. Application Data

(63) Continuation of application No. 13/718,960, filed on Dec. 18, 2012, now Pat. No. 8,755,567, which is a continuation of application No. 13/281,406, filed on Oct. 25, 2011, now Pat. No. 8,363,898, which is a continuation of application No. 12/614,808, filed on Nov. 9, 2009, now Pat. No. 8,068,642, which is a continuation of application No. 11/325,796, filed on Jan. 3, 2006, now Pat. No. 7,627,138.

(60) Provisional application No. 60/641,343, filed on Jan. 3, 2005.

(51) Int. Cl.
*G06K 9/00* (2006.01)
*H04N 7/18* (2006.01)
*H04N 5/14* (2006.01)
*G08B 13/196* (2006.01)

(52) U.S. Cl.
CPC .............. *H04N 5/147* (2013.01); *G08B 13/196* (2013.01); *H04N 7/18* (2013.01)

(58) Field of Classification Search
CPC ................................. H04N 5/00; H04N 7/00
USPC .......... 382/103, 107, 236; 348/143, 169, 170, 348/171, 172, 352
See application file for complete search history.

(56) References Cited

U.S. PATENT DOCUMENTS 6,625,812 B2 * 9/2003 Abrams ................... H04N 7/18 348/154
6,970,183 B1 * 11/2005 Monroe ................. G08B 7/062 348/143

(Continued)

*Primary Examiner* — Abolfazl Tabatabai
(74) *Attorney, Agent, or Firm* — Mahamedi Paradice LLP

(57) ABSTRACT

A system and method are provided for remotely monitoring images from an image capturing device. Image data from an image capturing component is received where image data represents images of a scene in a field of view of the image capturing component. The image data may be analyzed to determine that the scene has changed. A determination may be made that the scene has changed. In response to this determination being made, a communication may be transmitted to a designated device, recipient or network location. The communication may be informative that a scene change or event occurred. The communication may be in the form of a notification or an actual image or series of images of the scene after the change or event.

30 Claims, 11 Drawing Sheets

(56) References Cited

U.S. PATENT DOCUMENTS

| | | |
|---|---|---|
| 7,046,924 B2 | 5/2006 | Miller et al. |
| 7,116,353 B2 * | 10/2006 | Hobson .................. G07F 19/20 348/150 |
| 7,627,138 B2 | 12/2009 | Julia et al. |
| 7,868,912 B2 | 1/2011 | Venetianer et al. |
| 8,068,642 B2 | 11/2011 | Julia et al. |
| 8,363,898 B2 | 1/2013 | Julia et al. |
| 2013/0108110 A1 | 5/2013 | Julia et al. |

* cited by examiner

SYSTEM AND METHOD FOR REMOTELY MONITORING AND/OR VIEWING IMAGES FROM A CAMERA OR VIDEO DEVICE

RELATED APPLICATIONS

This application is a continuation of U.S. application Ser. No. 13/718,960, filed Dec. 18, 2012, which is a continuation of U.S. application Ser. No. 13/281,406, filed Oct. 25, 2011, now U.S. Pat. No. 8,363,898, which is a continuation of U.S. application Ser. No. 12/614,808, filed Nov. 9, 2009, now U.S. Pat. No. 8,068,642, issued Nov. 29, 2011, which is a continuation of U.S. application Ser. No. 11/325,796, filed Jan. 3, 2006, now U.S. Pat. No. 7,627,138, issued Dec. 1, 2009, which claims benefit of priority to U.S. Provisional Application No. 60/641,343, filed Jan. 3, 2005; all of the aforementioned priority applications being hereby incorporated by reference in their entirety for all purposes.

TECHNICAL FIELD

The disclosed embodiments relate generally to the field of network communications and connectivity. More specifically, the disclosed embodiments relate to a system and method for remotely monitoring and/or viewing images captured through a camera or video component.

BACKGROUND

Web cameras and network enabled image/video capturing devices have numerous applications, many of which relate to security and safety. With the growth of data networks, cameras are increasingly uses in connected environments.

In many applications and settings, cameras are connected to servers and their images are made available over data networks such as the Internet. One field of use for cameras and video technology include security and safety. Users can employ connected cameras to monitor secure locations or desired activities, such as in the case of "nanny cams." Even in such cases, a person normally needs to be manually view the images to see what occurred in the monitored scene. Under these past approaches, even though images from such cameras can be viewed remotely, the actual footage does need to be viewed in order for a viewer to see events and changes in the scene being viewed.

DETAILED DESCRIPTION

Figure 1:
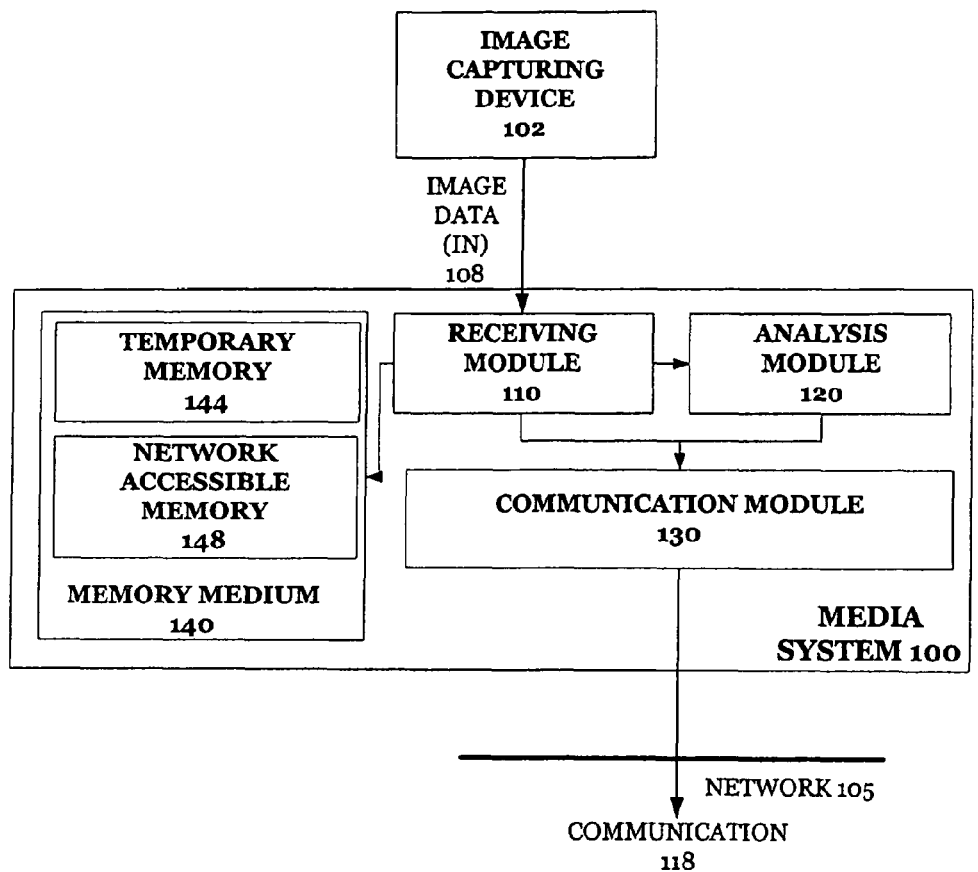
FIG. 1 illustrates a media system that handles image data from an image capturing device, and then sends communications about captured images to designated locations across a network in response to certain events, under an embodiment of the invention.

Embodiments of the invention enable individuals to receive communications about events or scene changes relating to the use of cameras that monitor scenes and activities. These communications may be communicated to individuals through use of networks, such as the Internet and/or cellular networks. In one embodiment, users can receive notifications of scene changes in a monitored scene, and respond affirmatively to actually view images of the monitored scene when it changes.

As will be described, embodiments of the invention enable individuals to (i) establish a system in which a standard camera device monitors a scene, (ii) receive notifications or other communications as to when an event or scene change occurs, and (iii) allows users to remotely view images of the scene after the change or event.

The mere ability for users to receive notifications of scene changes by itself enables users to take action. For example, one context for which embodiments of the invention may be employed is in home security and safety. To provide an illustrative example, a parent may employ a camera to view a child under nanny care while the parent is out. The occurrence of a scene change may initiate a notification to the parent that the child has entered a region of the house that is not secure (e.g. pool area). The parent can take immediate action. Under one embodiment, the parent can view images to confirm the event or scene change before taking action.

To provide another example, a user may employ a connected camera to view a business area during off hours. If the camera detects a scene change, one embodiment described below provides that a notification is transmitted to the user. The user can then select to view images of the scene change, on the off chance an intruder has entered the premise.

Numerous other applications may be employed for embodiments described herein. Any case where cameras are used to monitor or watch for events can provide a context for an embodiment of the invention.

A system and method are provided for remotely monitoring images from an image capturing device. Image data from an image capturing component is received where image data represents images of a scene in a field of view of the image capturing component. The image data may be analyzed to determine that the scene has changed. A determination may be made that the scene has changed. In response to this determination being made, a communication may be transmitted to a designated device, recipient or network location. The communication may be informative that a scene change or event occurred. The communication may be in the form of a notification or an actual image or series of images of the scene after the change or event.

Methods described with this application, or portions thereof, may be performed programmatically. As used herein, the term "programmatically" means through the use of programming, code or computer-implemented instructions.

One or more embodiments described herein may be implemented using modules. A module may include a program, a subroutine, a portion of a program, a software component or a hardware component capable of performing a stated task or function. As used herein, a module can exist on a hardware component such as a server independently of other modules, or a module can exist with other modules on the same server or client terminal, or within the same program.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holing data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Overview

FIG. 1 illustrates a media system that handles image data from an image capturing device, and then sends communications about captured images to designated locations across a network in response to certain events. Components of a media system 100 include a receiving module 110, an analysis module 120, a communication module 130, and a memory medium 140. The memory medium 140 may include one or more memory components, including a component for providing temporary memory 144 (e.g. cache) and a component for providing network accessible memory 148.

The receiving module 110 receives image data 108 from an image capturing component 102. The image capturing device 102 may have a local or network connection with the media system 100. For example, in one implementation, the media system 100 receives data from the image capturing component 102 across a wireline connection, a local network (e.g. Ethernet) connection or wireless connection (e.g. Infrared port, Bluetooth, or WIFI). In another embodiment, the media system 100 and the image capturing device are configured to communicate across a data network such as the Internet. It is also possible for the image capturing component 102 and the media system 100 to be integrated, such as, for example, in the form of a laptop computer (e.g. SONY VAIO manufactured by SONY ELECTRONICS).

Image capturing component 102 may correspond to any device or system that can capture images and communicate the images to a computer system. The image capturing component 102 may capture still images, video, or image frames in succession. Examples of commercially available image capturing devices include webcams and programmable video recorders or cameras. Image data 108 is output from the image capturing device 102. The image capturing component 102 may be directed onto a scene, so that image data 108 reflects a state of that scene at a given instance in time.

The receiving module 110 includes an interface to communicate with the image capturing device 102. In one implementation, image capturing device 102 provides video output. The receiving module 110 performs operations necessary for receiving a video stream from the image capturing device. For example, receiving module 110 may establish a connection with the image capturing device 102 and buffer the stream of image data 108 as it is received. In another implementation, receiving module 110 repeatedly polls image capturing device 102 for image data 108. For example, image capturing device 102 may capture snapshot images. Receiving module 110 may then poll the image capturing device 102 to retrieve some or all of the images captured.

In an embodiment, media system 100 sends a communication 118 to a device, person, and/or network location based on a change in the scene being imaged, as reflected by the image data 108. In another embodiment, the media system 110 sends the communication 118 in response to an event. While events may result in scene changes, events may also include occurrences such as programmatic triggers, or other occurrences that are independent of what happens in the scene being imaged.

In an embodiment, the analysis module 120 performs operations for detecting scene changes. The analysis module 120 may receive data from the receiving module 110, corresponding to the image data 108. In one embodiment, the analysis module 120 performs a comparison of image data 108 captured at a current or recent instance with image data captured at one or more previous instances in time. The comparison may be performed in any one of numerous ways. In one implementation, image data 108 corresponds to a series of frames containing bit data, and each frame may represent an instance in time. The comparison performed may be between two or more frames. Designated points in the bit map of each frame may be compared to see if a change in the scene occurred. Alternatively, a more comprehensive analysis may be performed, where a bit map of individual frames is compared to a bit map of other frames. A change in the scene may be detected based on a quantification of the amount of change that occurred. For example, if the bit map of a frame at a current instance is different by a threshold amount (e.g. 50%) from the bit map of any past instance, then the analysis module 120 may determine that the scene change occurred. A number less than a threshold amount may be viewed as an insignificant scene change. Under one embodiment, the user can specify the sensitivity level for when the change is to have deemed to occur. For example, the user may specify more sensitive setting where 10% of the pixels undergo a change between frames or a series of frames, as opposed to a less sensitive setting of 50%.

As an alternative to comparing frames at various instances, an embodiment provides that a scene change is detected when the bit map, or individual points in the bit map, match a certain profile. For example, columns in an edge portion of the bit map of one frame may appear dark, indicating that an object has entered the scene. The analysis module 120 may be configured to detect such darkened columns as a scene change, without needing to perform any comparison with previous frames.

Still further, the image capturing device 102 may be equipped or associated with functionality to eliminate or reduce the need for the analysis module 120. In one embodiment, the image capturing device 102 may include a motion sensor or other detection to detect when something significant has changed in the scene. For example, the presence of a motion detector may signal that something has entered the scene. Data from the motion sensor may be used to determine that the scene change has occurred. In one implementation, the image capturing device sends no images to the media system 100 until the motion detector detects something has entered the scene. Numerous other variations are possible.

When analysis module 120 detects the scene change, the analysis module may signal the communication module 130 to send the communication 118. Image data of the scene change, and possible of the scene just before the change occurred, may be stored in the memory medium 140. For example, in one implementation, image data 108 taken during a duration that includes the scene change (and perhaps just before or after) may be stored in a file in the memory medium 140, such as in the temporary memory 144 for immediate transmission to another location across the network 105, or in network accessible memory 148 for remote retrieval.

When analysis module 120 detects a scene change, communication module 130 communicates with a designated person, device or location across one or more data networks. The form of communication may depend on the embodiment of implementation. The media system 100 may include, for example: (i) in response to analysis module 120 detecting a scene change, the communication module 130 sends a notification to the end device, and in response to receiving an affirmation from the end device, sends image data of a certain duration that includes the scene changed to the same device that received the notification; (ii) in response to analysis module 120 detecting a scene change, the communication module 130 sends a notification to a designated location or device, and in response to receiving the affirmation, sends the image data of the certain duration to another designated location or device; and (iii) in response to analysis module 120 detecting the scene change, the communication module starts to send image data directly to a designated location or device. The communication 118 enables a recipient to remotely monitor and possibly view images captured by the image capturing device.

In another embodiment, communication module 130 sends the communication 118 in response to events. An event may correspond to a specific change occurring in the scene, not just any change. Alternatively, the events may include scheduled events, such as triggers that are programmed to take place. In such an embodiment, no analysis operations may be needed.

In either case, communication 118 may be transmitted across one or more data networks, including public networks such as the Internet, and/or cellular networks. The communication 118 may be transmitted across any combination of local or wide area networks. While public data networks such as the Internet are specifically contemplated, non-public and specialized networks may also be used. For example, embodiments of the invention may be implemented within a secure local area network, or Intranet, or within a secure wireless network such as used in military applications. In military applications in particular, a network may comprise a series of transmitters and receives, placed in various environments (sometimes ad-hoc) and linked by secured satellite communications.

Figure 2:
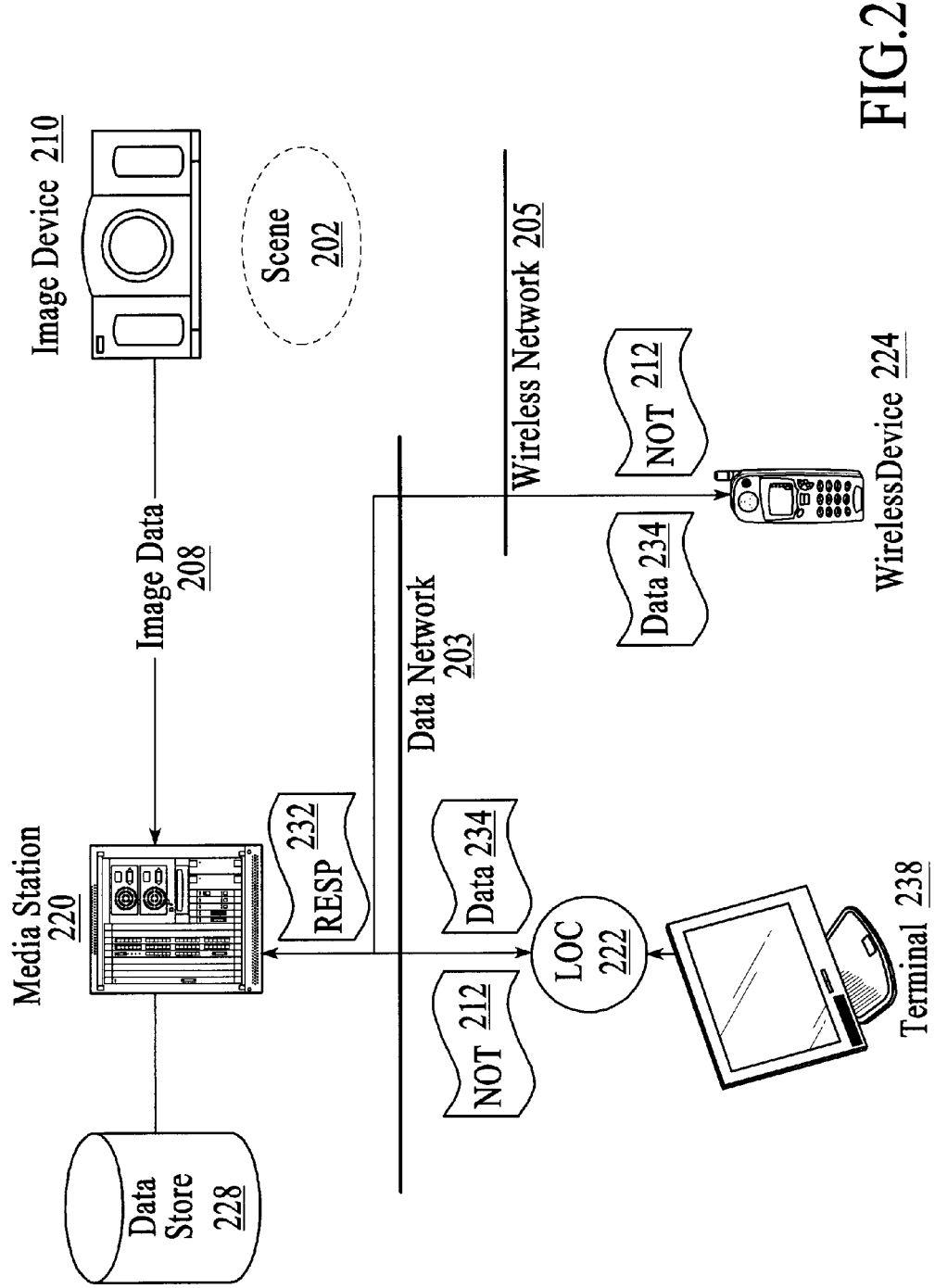
FIG. 2 illustrates a system configured according to an embodiment of the invention.

FIG. 2 illustrates a system configured according to an embodiment of the invention. An image capturing device 210 that is operable to capture images and/or video may be positioned to capture images/video of a scene 202. The image capturing device 210 may be fixed in position or rotate over a field of view that includes the scene 202. Image data 208 from the image capturing device 210 is fed to a media station 220. The media station 220 may correspond to any computer system (such as a media station, desktop computer, or laptop computer) that can handle media input from the image capturing device 210 and output data to have such media rendered on other devices. In one implementation, the media station 220 corresponds to an application executing on a desktop computer or work station. A system such as shown by FIG. 1 provides an example of how media station 220 operates.

In response to a scene change or event, one embodiment provides that the media station 220 sends one or more communications to a designated network location 222, or to a particular end device 224. The communications may be sent across data networks 203, including, for example, the Internet or across a wireless (cellular) network 205. In one example, the network location 222 may correspond to an email account, and the communications may correspond to an email message which is retrievable by another terminal 238. In an example provided by FIG. 2, the end device 224 is shown as a wireless device, addressable over a combination of data networks that may include the Internet and the wireless cellular network 205.

In one embodiment, the communications transmitted in response to the event or scene change is in the form of a notification 212. The notification 212 may correspond to a communication that informs the recipient of a scene change or event for which there is images or video. The form of the notification 212 may be, for example, text message, instant message or email. In the case where end device is a cellular device, the notification 212 may be in the form of a text message, such as a short message service (SMS) message, that informs the recipient of the scene change. Alternatively, the notification 212 may be in the form of a snapshot image, taken, for example, just after the scene change. For a cellular device, the snap shot image may be transmitted as a multimedia message service (MMS) message. Alternatively, the notification 212 may be in the form of data that is rendered or recognized as corresponding to the scene change on another device or location over the network. For example, communication module 130 (of FIG. 1) may transmit a data packet that causes a computer-generated effect (e.g. red blinking light) on a remote terminal in response to a determination of a scene change.

In response to notifications 212, the response 232 (if any) from the recipient determines what the next action will be. The recipient may decline, in which case image data of duration of time in question may be archived in a data store 228 or discarded. The recipient may accept in response 232. In one embodiment, an acceptance in response 232 may cause image data to be sent to the device or location from which there was acceptance. For example, the user may accept from end device 224 (e.g. cellular phone), and image data 234 may be sent to the wireless device in any one of numerous ways, such as (i) a series of messages (e.g. a series of MMS messages), (ii) streamed, or (iii) attachment email that for an email account handled by the wireless device.

In another embodiment, no notification takes place. When an event or scene change triggers action, the media station 220 transmits image data 234 to the designated location 222 or end device 224, with no intervening communication. The image data 234 may correspond to the image data 208 received from the image capturing device 210, or the image data 234 may be configured or formatted for transport. Examples of how image data 234 may be configured include reducing resolution, frame rate and even converting video data to individual still images (sending frames spaced far apart in time). As will be described, the manner in which image data 234 is configured or otherwise formatted may depend on, for example, the capabilities of the end device 224 to receive image data 234, and/or the capabilities of the data networks (e.g. Internet, wireless networks) to effectively transport such data.

In one implementation, the image data 224 may be directed to an email account, and may be carried in the form of an email and attachment with a media file. Alternatively, prior or concurrent with transmission of image data 234, additional communications may be transmitted from the media station 220 for purpose of initiating a data stream transfer of image data 234. In such an embodiment, communication 212 may establish a connection with the end device 224 and then automatically stream data using that connection. Various alternatives and combinations of the different communications (notifications 212, image data 234 etc.) are also possible.

In another embodiment, media station 220 may respond to an acceptance in response 232 by sending the image data 234 to another location or device. For example, end device 224 may receive the notification 212. The user may accept in the response 232 to the notification 212. Rather than send the image data 234 to the end device 224, an embodiment provides that the image data is sent to an email account of the user, or stored in the data store 228 for subsequent retrieval.

As another implementation, the notification 212 may be sent in response to a scene change or event. Image data 208 for that scene change or event may then be stored in a data storage element 228 for subsequent retrieval. The data storage element 228 may be local to the media station 220, or remotely located across a network. The image data of the event or scene change may be stored in a file for subsequent retrieval. The retrieval may also be through network access. In such an implementation, no response may be needed to the notification 212 in order for the image data to be stored.

Methodology

Figure 3:
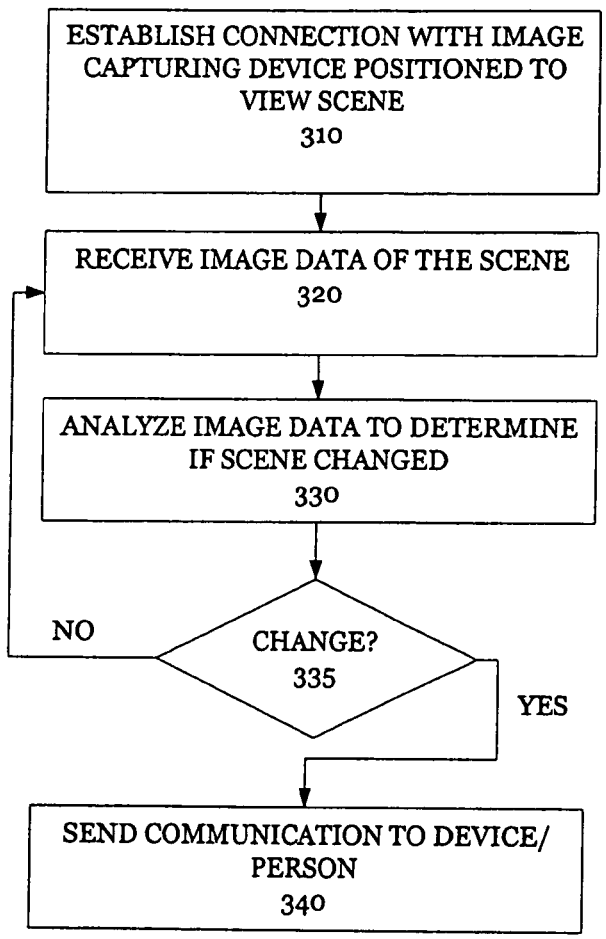
FIG. 3 illustrates a method for implementing remote monitoring and/or viewing of an image capturing device, under an embodiment of the invention.

FIG. 3 illustrates a method for implementing remote monitoring and/or viewing of an image capturing device, under an embodiment of the invention. A method such as described in FIG. 3 may be performed on a media station as described in FIG. 2, although components of FIG. 1 may also be referenced in relation to components that may perform parts of the method. Throughout this section application, reference may be made to elements of FIGS. 1 and 2 for purpose of illustrating suitable components or elements for performing a method or portion thereof.

Step 310 provides that a connection is established with an image capturing device. In one embodiment, the image capturing device is part of a personal network, as described in U.S. patent application Ser. No. 10/888,606, entitled "System and Method for Enabling the Establishment and Use of a Personal Network," the aforementioned application being incorporated by reference in this application for all purposes and in its entirety. As part of the personal network, the image capturing device may be network-enabled, and its capabilities may be known to the media station and other elements that can communicate with it. In one embodiment, the image capturing device is connected to a computer station that holds a media station application as described in FIG. 2. A wireline (e.g. Universal Serial Buss) connection or local wireless connection (e.g. Bluetooth or WIFI) may be used to establish communications with the image capturing device.

Once a connection is established with the image capturing device, the image capturing device may be positioned to view and take images of a scene. In one embodiment, the image capturing device is a video camera, so that it can be in a state where it always takes image data in the form of video. In step 320, the video feed is continuously transmitted to the media station 220, where image data from the feed is analyzed. Alternatively, the image capturing device may be controllable as to when it records and/or transmits images.

In scene 330, image data transmitted from the image capturing device is analyzed to determine if a significant change has occurred to the scene. Numerous techniques exist for performing such a comparison. For example, an image (or frame) from a recent instance may be compared to an image or frame from one or more past instances. A bit map of all of the image or frame may be compared, or just specific regions or points (e.g. corners or borders). The result of any comparison may be quantified, and if it exceeds a threshold, in step 335, a determination may be made that a sufficiently significant change in the scene has occurred.

If the determination of step 335 is made, then step 340 provides that a communication is sent to a designated recipient, device and/or network location. As described with FIG. 2 and other embodiment, the communication may be in the form of a notification, or it may be in the form of a continuous or series of communications that carry image data corresponding to the scene change. If the determination of step 335 is not made, the method may return to step 320, where image data from the scene is continued to be received.

According to one embodiment, image data that is received may be recorded or archived. In particular, if the image data reflects a scene change (or the occurrence of an event), the image data for a particular duration of time that includes the scene change or event may be stored and/or marked. For example, such image data may be stored separately in a file. If a communication is sent out in the form of a notification, the file with the image data of the scene change or event may be made available for viewing, either remotely or locally from a location where the image data is stored.

As an alternative to an embodiment such as described in FIG. 3, the image capturing device may be controllable to transmit images responsive to events, such as information provided from other components or in response to triggers and other scheduled events. In one embodiment, the image capturing device may be controllable by the media station 220 in connection with other components that indicate the occurrence of an event and/or scene change. As such, the media station 220 may send control signals to operate the image capturing device to take images or video. For example, in one implementation, a motion sensor may be positioned to have a similar field of view as the image capturing device. Signals from the sensor may indicate that an object has entered the scene being monitored. Control signals from the media station 220 may be transmitted to the image capturing device 220. In response to receiving the control signals, the image capturing device may send video or other image data of the scene.

Methodology for Sending Notification of Scene Change

Figure 4:
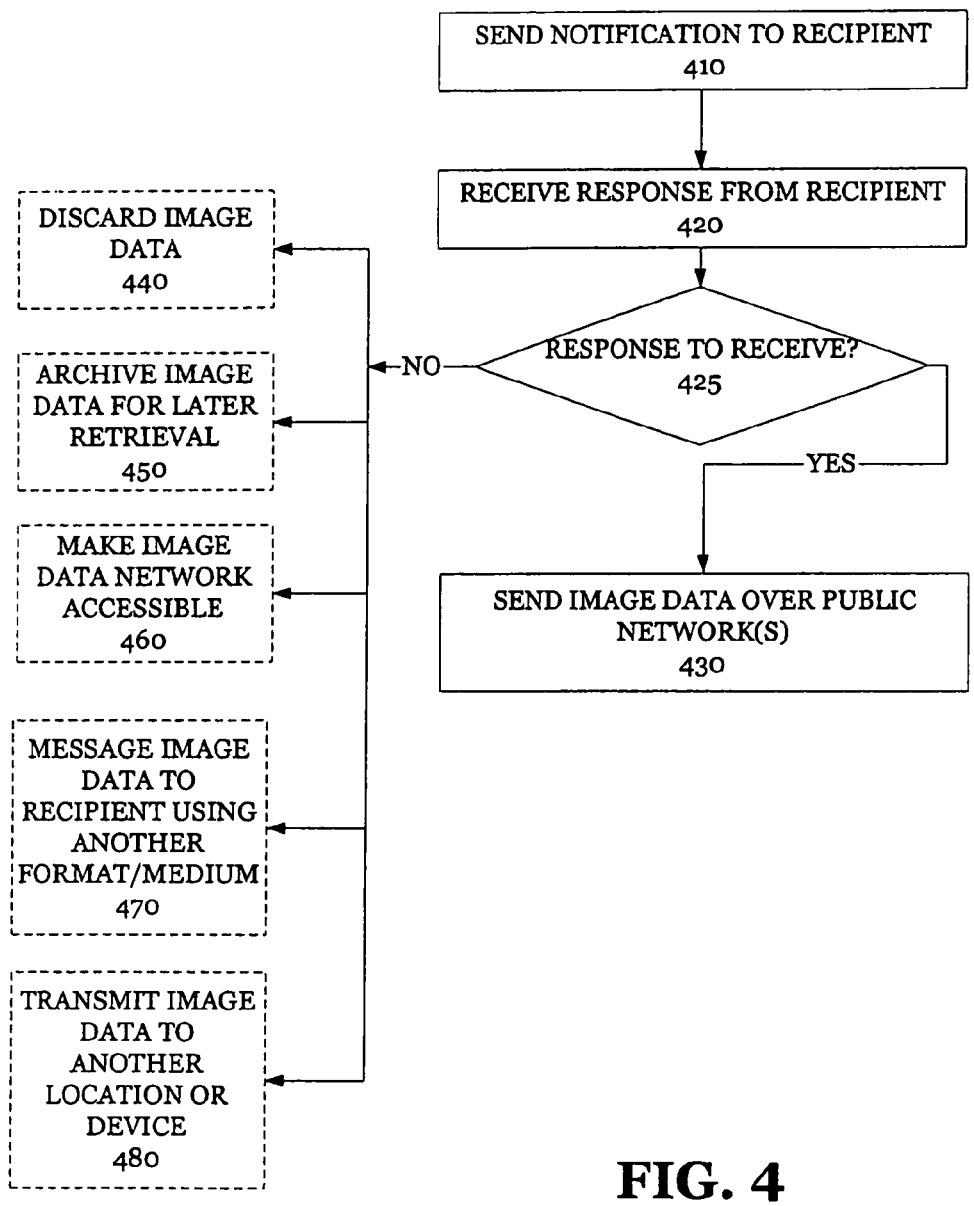
FIG. 4 illustrates a method for using notifications to communicate the occurrence of a change or event in a scene that is imaged by an image capturing device, under an embodiment of the invention.

FIG. 4 illustrates a method for using notifications to communicate the occurrence of a change or event in a scene that is imaged by an image capturing device, under an embodiment of the invention. A method such as described in FIG. 4 assumes that a scene change or event has occurred. Thus, image data exists from the image capturing device that can be conveyed for viewing.

In step 410, a notification may be transmitted to a recipient. The recipient may correspond to a person, network location and/or end device. The form of the communication may be a message (email, instant message, text message), or it may include an actual clip or image from the image data received. In an embodiment in which a wireless, cellular device is used, the notification may correspond to a SMS (text) or MMS (image) message. Other forms of notifications, such as described elsewhere in this application, may also be used.

In an embodiment, a response is received from the recipient. In one embodiment, the response may provide (i) the user does not wish to receive image data, (ii) the user does wish to receive the image data, or (iii) some other action. In step 420, the response from the user is received. If the determination is made in step 425 that the response is to receive image data, then step 430 provides that image data is sent to the recipient over one or more networks, such as the Internet or a wireless network.

The determination in step 425 may be something other than the recipient wishes to receive the image data. If the recipient does not wish to receive the image data, then step 440 may provide that the image data is discarded. For example, the notification may be in the form of an MMS image showing one frame from the changed scene, and the user's determination that the changed scene is not a recordable event may be used to discard all data from the scene change. As an alternative, in step 450, the image data may be archived, or stored in a location for later use. Either step 440 or step 450 may be a default to the recipient's election to not receive any image data. As another alternative, a video segment may be recorded as a result of the event trigger, even if the video is stored for later viewing, and not shown to the user.

As mentioned, an embodiment permits the recipient to have a media system perform some other action other than store or discard the image data. Examples of some other actions are provided in FIG. 4. Based on a determination in step 425, step 460 provides that the image data of the scene change or event occurrence is stored in a file that is network accessible. For example, the image data that would have been sent to the recipient's device had the user responded affirmatively is instead sent to a file location that the user can later access and view from over the Internet.

As another alternative, in step 470, the image data of the scene change or event occurrence is messaged to the recipient using an alternative form of messaging. For example, the notification may be sent to the recipient's wireless device using an SMS message, and the image data may be emailed to an email address associated with the recipient. For example, the user may request an option response to the notification, electing to have the image data emailed to him for later retrieval. The information needed for performing this step may be stored as part of the user's profile, or it may be entered by the user in response to receiving the notification.

Step 480 provides another possibility in response to the user's response to the notification. In step 480, the image data is transmitted to another location or device. The specific location or device (e.g. email address or phone number) may be provided by the user in response to the notification, or the information may be stored as an alternative default.

Numerous other alternatives or actions are contemplated, particularly as to how the user may respond to the notification. As described in the priority applications, it is possible for a system to be configured so that the recipient may have sufficient connectivity and remote control capability of the computer on which the media system is provided to control it to perform numerous actions. Furthermore, while an embodiment such as shown in FIG. 4 illustrates that the user can accept video or perform some other action, other embodiments may simply eliminate the user's decision. For example, the user may receive a notification, and one of the actions listed in steps 440-480 may then be performed.

Figure 5:
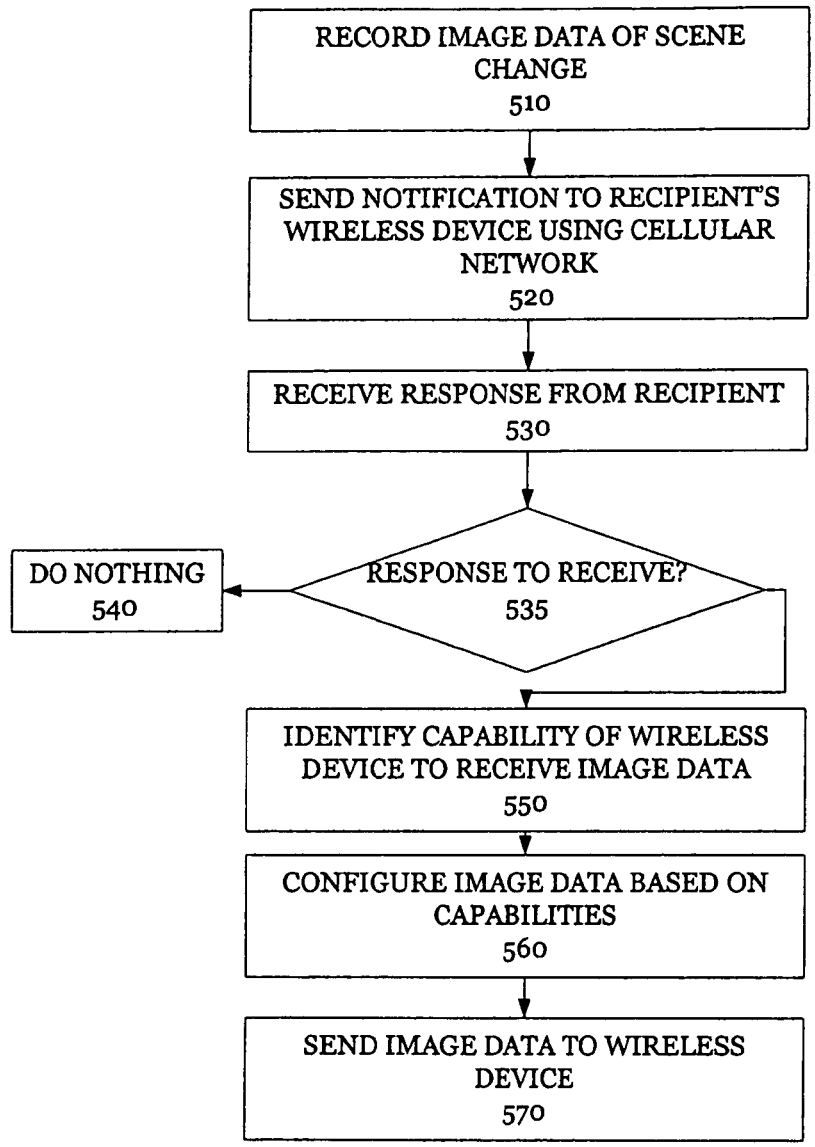
FIG. 5 illustrates an embodiment in which the recipient device has limited capabilities for receiving image data of the extent that is outputted by the image capturing device, under an embodiment of the invention.

FIG. 5 illustrates an embodiment in which the recipient device has limited capabilities for receiving image data of the extent that is outputted by the image capturing device. A method such as described in FIG. 5 may be implemented using components or elements such as described with FIGS. 1 and 2. In describing a method of FIG. 5, the recipient device with the limited capability is assumed to be a wireless, cellular device, which on occasion may have limited bandwidth to receive data, as well as having smaller screen sizes, and less processing resources and memory. A method such as described with FIG. 5 also assumes that a scene change or event has occurred.

Step 510, image data of the scene change is recorded. For example, the image data may be stored in a file in memory, where it can be copied for transport to the wireless device.

In response to the occurrence of the scene change or event, a notification may be sent to the recipient's wireless device. In one embodiment, the notification is in the form of an SMS message, containing text that informs the user that something has happened to change the scene being monitored. In another embodiment, the notification is in the form of an MMS message that shows the user a snap shot of the scene change.

Step 530, a response is received from the recipient device. The response may be a message, for example, that is in response to an SMS or MMS notification. A determination may be made in step 535 as to whether the user's response is to receive or not. In one implementation, the notification may provide a user with links to response answers to the notification (e.g. "Receive now" or "Receive Later"). In another implementation, any response to the notification may be accepted as a positive response, while a non-response results in the media system performing no action (step 540).

If in step 535, a determination is made that the recipient elects to receive image data, then step 550 provides that the capabilities of the recipient device are identified. These capabilities may correspond to available bandwidth, screen size, and ability to handle video data. For example, some wireless devices cannot handle any video, but may be able to handle a series of MMS messages containing snap shots of the scene change. According to one embodiment, information about individual device capabilities is established and used through implementation of a personal network, as described in as described in U.S. patent application Ser. No. 10/888,606, entitled "System and Method for Enabling the Establishment and Use of a Personal Network," (incorporated by reference herein). The device capabilities maybe stored in a data structure accessible to the media station. A more complete description of how device capabilities between interconnected devices is known and compensated for is provided in the priority applications. As described in the aforementioned incorporated application, the device capabilities may be declared or otherwise obtained when the wireless device first communicates with a personal network on which the media system resides.

In step 560, image data that is to be transmitted to the wireless device is configured based on the identified device capabilities. In one implementation, the image data received from the image capturing device is a video stream. The device capabilities may reflect a need to reduce the frame rate of the video stream prior to sending the image data to the wireless device. Additionally, the resolution of the image may be reduced to accommodate the limited screen of the wireless device. The screen rations may be similarly changed to accommodate the specific display of the wireless device.

In step 570, image data, as configured based on the capabilities of the end device, is sent to the device. In one implementation, the transmission is of recorded or stored data, so that the recipient sees video of the scene change immediately after it occurs. In another implementation, the transmission is of the scene after the response to the notification is received. In the latter case in particular, the transmission to the end device may be concurrent with the transmission of image data from the image capturing device. Thus, for example, the recipient holding the end device may be able to receive a near-real time picture of the scene after a change or event, taking into account the latency of the wireless network and the media system.

The duration in which the transmission occurs may be one of choice. For example, the duration of the image data transmission may be set by default, by user-action, or until the scene dynamic is analyzed and considered to be static or unchanged. Thus, for example, a preference setting may set the image data transmission to last ten seconds, or to convey image data to cover one minute of time that the scene is viewed by the image capturing device.

The image data may replay video or images to reflect the actual speed of the events in the scene as they occur. Alternatively, the image data may be sped-up, or subject to the recipient's control to speed-up or slow-down.

Personal Network Implementation

An embodiment of the invention may be implemented in a networked environment where (i) images from the image capturing device may be transmitted or otherwise made available to numerous devices, having different platforms and/or operating systems and capabilities, (ii) images from the image capturing device may be transmitted or otherwise made available to network resources that are linked are part of the networked environment, and (iii) the image capturing device is remotely controllable through one or more other devices and/or resources that are part of the networked environment.

According to one embodiment, a suitable network environment is a personal network. A personal network is an example of networked system that can extend to multiple network domains. The components of the personal network, termed "satellites", are configured to know of the elements in the personal network that are pertinent to them, as well their respective connectivity status. Additionally, satellites know of other satellite's functionality, and have the capability of borrowing the functionality of one satellite to communicate with another satellite. In this content, embodiments described herein are useful, in that the personal network offers an environment where profile information is readily attainable and to great specificity. Furthermore, the personal network offers a medium in which one content item can be transmitted to numerous devices, when such devices would normally be considered incompatible to share content.

The term "satellite" may includes a designated element for a personal network that is capable of direct communications with one or more other elements of the network. Examples of satellites that can be used with embodiments described herein include a device, an application, a set of data, or a resource such as a third-party Internet account. In one embodiment, each satellite in a personal network corresponds to elements having an interface that enables that satellite to communicate directly with other satellites, particularly when the other satellites are provided the same or a compatible interface. The direct communications amongst satellites may correspond to peer-to-peer communications.

Figure 6:
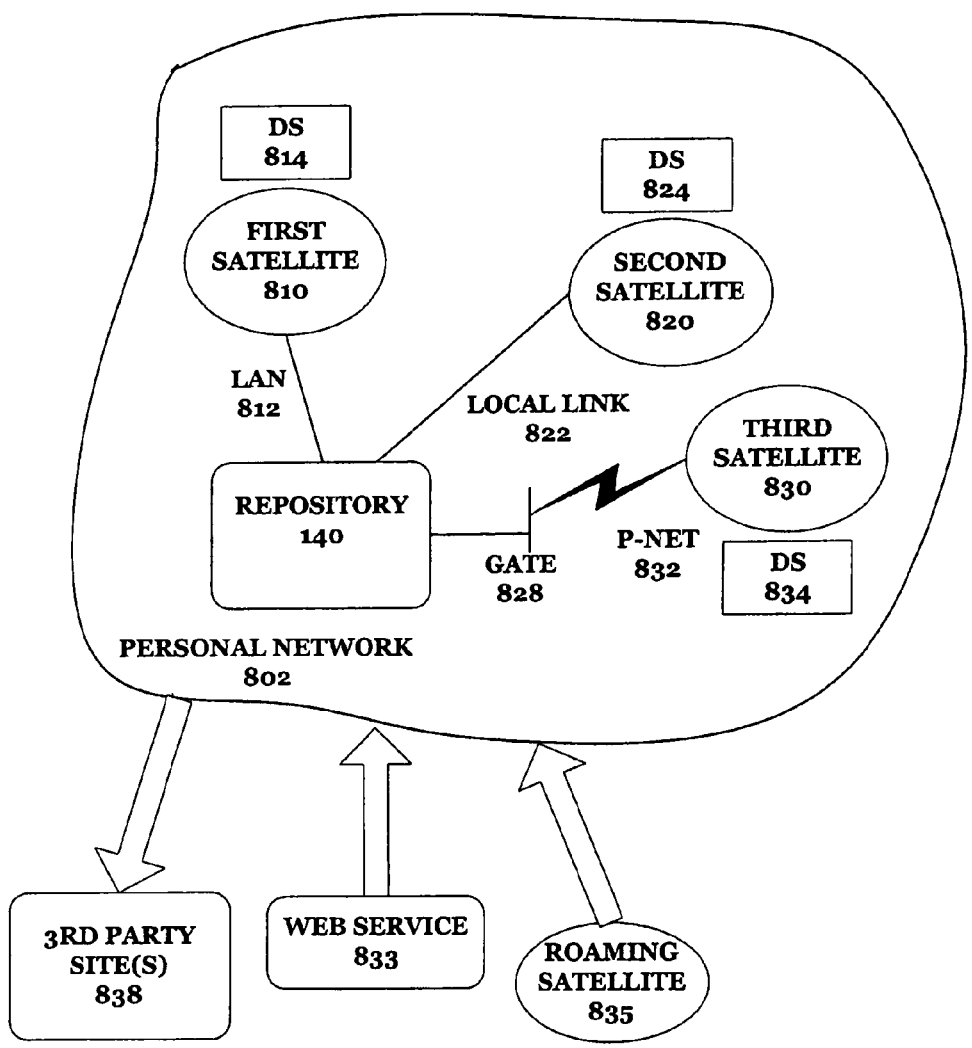
FIG. 6 illustrates a system on which a personal network can be formed from multiple devices, according to an embodiment.

FIG. 6 illustrates a system on which a personal network can be formed from multiple devices, according to an embodiment. As shown, a personal network 802 is formed in part by a first satellite 810, second satellite 820, and third satellite 830. In one embodiment, each satellite 810, 820, 830 is provided on a separate device. However, a satellite may also correspond to an application or data set residing on a particular device, so that the particular device can include multiple satellites. In one embodiment, a satellite corresponds to any application, sequence of instructions, or set of data which can be provided an interface (such as an application program interface or API) for other use by other applications. In particular, two or more heterogeneous applications or devices (e.g. devices that have different operating systems or platforms) may be enabled to communicate with one another through use of a similarly configured API for purpose of allowing at least one application to control or otherwise use another application. For example, a satellite may correspond to a commercially available media player application that has been recompiled to include a reconfigured API for use with other similarly configured (but perhaps heterogeneous) applications. As will be described, an embodiment provides that the API accommodates a heterogeneous network.

A repository 840 is coupled to communicate with each satellite 810, 820, 830. As will be described, the repository 840 maintains an identification of each satellite actively connected to the personal network 802, as well as a description of a capability of each such satellite. The repository 840 may correspond to a satellite that performs, as part of its operations, the task of maintaining a table or master list of such information about all other satellites in the personal network. Each satellite 810, 820, 830 may also communicate with one or more of the other satellites directly. In one embodiment, communications between the repository 840 and each of the satellites 810, 820, 830 is of a server-client relationship, while communications amongst satellites is of a peer-to-peer nature. In the context of embodiments described, one difference between client-server and peer-to-peer communications is that with client-server communications, communications between two satellites (that are not servers) requires communications with at least one intermediary—that being the server. First, one satellite would have to exchange communications with the server, then the server would forward that communication by exchanging communications with the other satellite. In many situations, this can be disadvantageous, because the server can create a bottle-neck. In peer-to-peer communications, the intermediary server can be avoided, as communications between two satellites is direct.

The personal network 802 may be formed by interconnecting satellites across multiple types of communication mediums. In an example provided by FIG. 6, a local area network (LAN) 812 is used to couple (indirectly or directly) the first satellite 810 to the repository 840. A local communication link 822 is used to couple the second satellite 820 to the repository 840. A public network 832, such as the Internet, is used to couple the third satellite 830 to the repository 840. Once the personal network 802 is established, access to satellites and/or the resources of the personal network may be made through use of public networks such as the Internet. In one embodiment, resources available on the personal network are presented, made viewable or otherwise accessible to the user (or to those with permission to access the network) as a single entity. For example, files, content, programs and other resources may be presented in an aggregated fashion, under a single user-interface, so that the user is unaware where the different resources originated from. Thus, for example, a user may define the satellites of the personal network 802, then subsequently access the personal network 802 from any remote location to view resources on the personal network as if the personal network was one computer or network element.

In an embodiment, satellites 810, 820, 830 may communicate with repository 840 and with each other. While satellites 810, 820, 830 are connected and disconnected, the repository 840 may always be active on the personal network. Accordingly, the repository 840 may be made redundant, and running on different locations. In addition, the contents of the repository 840 may be archived. The communication amongst satellites or between a particular satellite and the repository may be direct or indirect. For example, while FIG. 6 illustrates the local communication link 822 extending between the second satellite 820 and the repository 840, the local communication link 822 may actually extend between the second satellite 820 and another satellite. Thus, for example, the first satellite 810 and the second satellite 820 may be connected using the local communication link 822, so that the second satellite 820 may be interconnected to one or both of the other satellites 810, 830 and the repository 840 using both the local communication link and the LAN 812.

In FIG. 6, the third satellite 830 is illustrated as a non-mobile or non-roaming device that connects to form part of the personal network 802 over the Internet. In an embodiment, the third satellite 830 communicates with one or more other satellites 810, 820 and the repository 840 using a gateway or proxy 828. For example, the gateway 828 may provide access to a home network, on which the repository 840 and one or more of the other satellites resides. The third satellite 830 may use the gateway 828 to establish communications with the other satellites and the repository 840. Resources of the personal network may be made available to other types of remote network sites. Furthermore, other remote sites may be made part of the personal network, or otherwise used to contribute to the personal network. In one embodiment, a roaming device 835 may access the personal network 802. The roaming device 835 may be a satellite, in that it includes an API that can communicate with or receive communications from other satellites. Alternatively, the roaming device 835 may be a non-satellite, in that it includes no API, but has other applications with limited ability to use or work with certain resources on the personal network. For example, the roaming device 835 may include a browser to enable it to view content from the personal network, and perhaps perform certain actions (such as send files that are handled by the personal network). Still further, the roaming device 835 may correspond to a quasi-satellite, in that it may have limited permissions or usability on the personal network as compared to other satellites, but otherwise includes an API is used to communicate with or receive communications from other satellites. The roaming device 835 may also use the Internet, or a wireless network (such as a cellular network) to establish the connection. While third satellite 830 may have a designated location of known IP address, roaming devices may connect to the personal network 802 from any location.

In addition to roaming device 835, access to the personal network 802 may be made through a web-service 833. In an embodiment, an Internet site may be provided as a service to enable or assist subscribers/users to establish personal networks. The users may provide content, resources, configuration instructions, and/or other information to establish, configure, and/or provide resources or content on their own respective personal network. In an embodiment, the user may also have limited use (such as to view or otherwise consume content) of the personal network, similar to that of a non-satellite roaming device, described above. In another embodiment, the web service 833 can be used to make any Internet terminal a point form which a user can provide such information for his or her personal network. It is possible for the web service 833 to act as an interface to provide satellite or quasi-satellite functionality to any Internet terminal.

In an embodiment, personal network 802 may comprise resources, and in particular, user-designated resources, which are made available over public networks, such as the Internet. For example, a designated, third-party Internet site 838 on which a user's data or application is maintained may be made an element of the personal network 802. An example of the designated network location 838 may be a personal account for maintaining files (such as pictures or media) on a storage medium provided by a third party Internet site (e.g. YAHOO! BRIEFCASE). These locations may be linked with the satellites 810, 820, 830 to form the personal network 802. Once linked, content may be selected or otherwise provided from the designated network location 838 to other satellites on the personal network 802. Alternatively, resources such as memory may be made available to other satellites in the personal network 802.

As described by embodiments, personal network 802 combines the interoperability and availability of heterogeneous elements. In operation, elements of the personal network 802 may aggregate content, data, applications, and resources to maintain an appearance a single entity. Furthermore, as will be described in greater detail, satellites in the personal network 802 may cooperate with and use each other's capabilities even though the satellites are heterogeneous elements. Thus, the satellites cooperate with one another in a manner that is seamless and platform independent.

According to an embodiment, at least some of the capabilities for each satellite are known and accounted for in the personal network 802. The repository 840 maintains a record of each satellite's known capabilities, including the operations it can perform, and the limitations or requirements that must be accounted for in using that satellite. This includes specific functionality provided by each satellite, interoperability requirements of each satellite, any hardware limitations presented by a satellite or a device on which the satellite is provided, and bandwidth limitations of the particular satellite. Information about each satellite's capabilities may be provided in the form of code. In one embodiment, a natural language code is used to record information about each device's capabilities. In addition to satellite identification and capability information, the repository 840 may maintain status information and location information for each satellite. The status information may indicate whether a satellite is connected or not connected to the personal network. Alternatively, the status information may be maintained by only recording the presence of active satellites on the personal network 802. The location information may correspond to the local IP address of a device on which the satellite resides. In the case of satellite 820, which is connected to the personal network 802 via local link 822, the location information may correspond to an identifier of that satellite and an IP address of the device or network location to which that satellite is connected.

While some capabilities are known, an embodiment provides that other capabilities of individual satellites are determined on-the-fly. This is particular the case with capabilities that are prone to fluctuate, such as bandwidth. For example, the bandwidth of a wireless device may vary, depending on the time of day or location of the wireless device. One embodiment provides that another satellite queries or tests a satellite of interest for a particular set of capabilities. For example, the testing satellite may attempt to send the satellite of interest a file, and measure the time or amount of bandwidth that was available for that operation. Once the determination is made, the testing satellite can pass the information to a satellite that actually wants to use the satellite of interest. In one embodiment, the testing satellite has a dedicated function or role, although other embodiments provide that the testing satellite and the satellite that wants to use the satellite of interest are the same. The testing satellite may correspond to the repository 840, or to a dedicated satellite.

While satellites in the personal network 802 may communicate with one another and use each other's capabilities, it may be assumed that each satellite does not need to communicate or use every other satellite. Rather, each satellite may have a set of pertinent satellites on the personal network 802 that it may communicate with and use. For example, a digital camera application may require use of satellites that include photo imaging application and photograph printer driver, but the camera application will have no need of an audio playback component. Thus, the set of pertinent satellites for the digital camera do not include the audio playback component.

In an embodiment, each satellite 810, 820, 830 includes an associated data structure that maintains information about the pertinent set of satellites for that satellite. The first satellite 810 includes a first local data structure 814, second satellite 820 includes a second local data structure 824, and third satellite 830 includes a third local data structure 834. It is also possible for two satellites to share a local data structure, such as in the case where two satellites reside on a common machine or are interconnected by local connections. Each of the satellites 810, 820, 830 may use their respective local data structures 814, 824, 834 in order to access, locate and use other satellites in the personal network. The local data structures 814, 824, 834 may each receive their information from the repository 840. Thus, the information maintained in the local data structures 814, 824, 834 may be in the same form as the information maintained in the repository 840. In either case, the local data structure may serve as a means to reduce the amount of information that needs to be maintained for a particular satellite. Once information is transferred from the repository 840 to the local data structures 814, 824, 834, the respective satellites 810, 820, 830 may avoid having to make requests for such information from the repository. While it is possible to provide information to the satellites exclusively from the repository 840 without implementing local data structures 814, 824, 834, the use of the local data structures provides a more efficient and secure means for making necessary information available to the respective satellites 810, 820, 830. This is particularly true in the case where satellites are interconnected through large or public networks.

It should be noted that while a home network is one context for the personal network 802, implementations may be used in which the personal network exists separate from the home network. For example, a user's personal network and home network may share some satellites, but some devices or applications of the home network may not be shared with the personal network, and vice-versa.

With regard to embodiments such as described with FIGS. 1-5, an image capturing device may be configured to communicate as a satellite in a personal network with other satellites. As such, it may declare its capabilities, and receive information about the capabilities of other devices and resources. To this end, devices and resources that are capable of utilizing the image capturing device can do so, regardless of the location or type of device. Thus, the images from the image capturing device may be made available to a website service, media station, cell phone, personal digital assistant (PDA) etc., with or without notifications.

Establishing the Personal Network

Figure 7A:
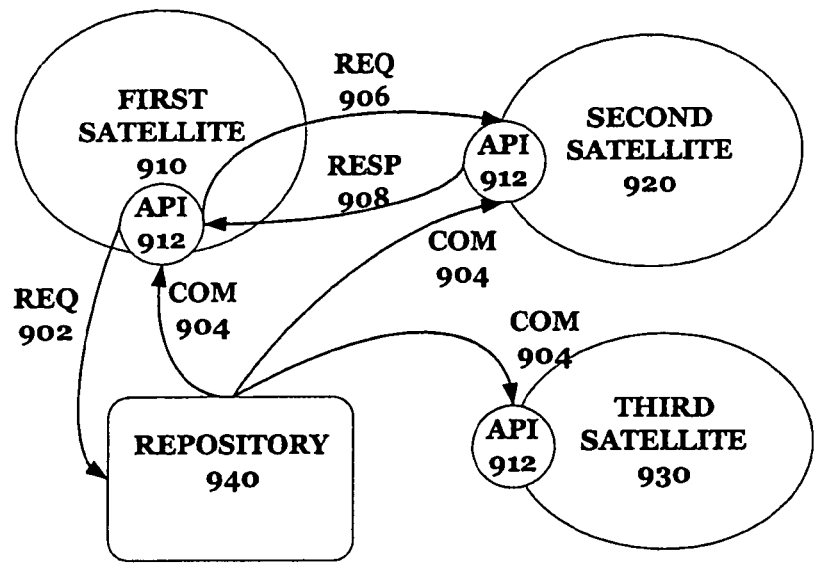
FIG. 7A describes a methodology that illustrates how a personal network, such as described in FIG. 6, may be established for use with an embodiment of the invention.

FIG. 7A describes a methodology that illustrates how a personal network, such as described in FIG. 6, may be established. The satellites and components described with FIG. 7A may or may not coincide with elements of FIG. 6. For brevity, the connectivity medium of the satellites described in FIG. 7A, or specifics as to how the satellites operate with other satellites, will not be detailed again.

Figure 7B:
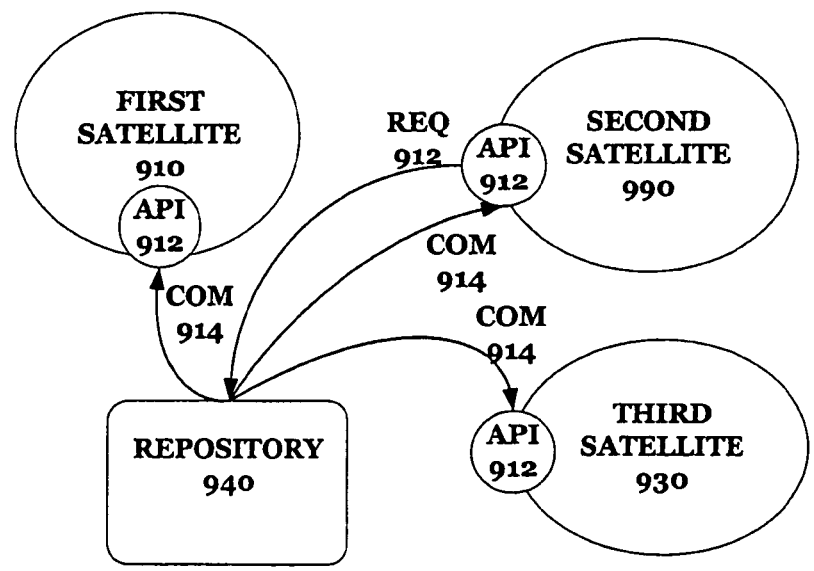
FIG. 7B illustrates a methodology of how a personal network may track satellites that disconnected from the network, for use with an embodiment of the invention.

FIG. 7A illustrates a first satellite 910, second satellite 920, and third satellite 930, each of which is interconnected to a repository 940. Each satellite 910, 920, 930 corresponds to one of a data set, application or device. Furthermore, each satellite 910, 920, 930 includes a corresponding application program interface (API) 912 to enable one satellite to communicate with another satellite, or to provide access to the other satellite. The API 912 enables connectivity amongst satellites 910, 920, 930 in order to enable the satellites to share and/or receive capabilities, content and other resources. The API 912 also enables the satellites 910, 920, 930 to communicate with the repository 940 in order to receive connectivity information and other information about the other satellites. Each satellite 910, 920, 930 is one of a data set, application or device that either includes the API 912 as an integrated component, or is capable of being used when the API 912 is provided to it. In the latter case, the satellite may correspond to a commercially available application (perhaps provided by a third party) that can be recompiled or reconfigured to include API 912. Additionally, the satellites may correspond to modules, components and data stores as described with components of system 702 in FIG. 7.

In an embodiment, a personal network may be established by individual satellites joining the personal network. Initially, the repository 940 may be established, and additional satellites are added to form the personal network on which the second satellite 920 and third satellite 930 are already members. FIG. 7A illustrates a case where first satellite 910 is added to the personal network. A request 902 is made by the first satellite 910 to the repository 940 to join. The request 902 is a client-server type communication. Included in the request are instructions containing information about the capabilities of the first satellite 910. Additional information describing the first satellite 910 to the repository 940 may also be included. The additional information may include data identifying a location of the first satellite (e.g. IP address).

The repository 940 receives request 902, and records the information, including the instructions and the location of the first satellite 910. In response to receiving the request 902, the repository 940 sends out a communication 904. According to one embodiment, the communication 904 is sent out to all of the satellites that are actively connected to be in the personal network. The communication 904 includes information about all of the active satellites in the personal network. As such, the communication 904 provides information to each satellite about what satellites are part of the personal network at a given moment when the first satellite 910 joins. The information in the communication 904 may also include the capabilities and location of each device actively connected to be part of the personal network.

According to another embodiment, the repository 940 includes intelligence to be able to determine what satellites are pertinent to the newly joined first satellite 910. The communication 904 may only be sent out to the pertinent satellites, rather than broadcast to all satellites. This provides one mechanism by which the satellites can maintain local data structures (e.g. 914, 924, 934) that omit information about non-pertinent satellites. In one embodiment, repository 940 may acquire the intelligence for determining what satellites are pertinent to the first satellite from the first satellite itself, and specifically from the request 902 or other notification from the first satellite. Alternatively, the repository 940 may maintain or have access to a master library that includes lists of pertinent satellites for any given satellite. Still further, as another alternative, each satellite may include its own intelligence to determine what information contained in communication 904 is about non-pertinent satellites and can be omitted.

Once communication 904 is completed, the first satellite 910 can be assumed to be part of the personal network 902. It is then possible then for communications to be made to the first satellite 910 from other satellites. In the personal network, one satellite may use a service provided by another satellite. A service is part of the capabilities described for a particular satellite. Thus, the capabilities of each satellite may include the service provided by that satellite, as well as limitations or features of the particular satellite. In, for example, a case where first satellite 910 needs a service from second satellite 920, the first satellite makes a request 906 directly to the second satellite. The request 906 may be a peer-to-peer communication, as opposed to a client-server communication. The second satellite 908 may then generate a response 908, which establishes that the second satellite 920 will provide the requested service to the first satellite 910.

As an alternative, request 906 may not be specific to second satellite 920, but rather a broadcast or announcement sent on the personal network. This may occur in an embodiment where the first satellite 910 does not know the capabilities of other satellites, or when more than one satellite can provide the requested service. An available satellite that is capable of providing the requested service may then generate the response 908.

According to an embodiment illustrated by FIG. 9B, the personal network may be maintained by tracking when satellites disconnect or otherwise become unavailable on the personal network. For example, second satellite 920 may be disconnected. In an embodiment, second satellite 920 may be disconnected from the personal network in a manner similar to the first satellite 910 joining the personal network. That is, second satellite 920 sends a notification 912 to be disconnected. Since the request is to be discontinued, the notification 912 may not include information, such as a description of the capabilities or location of the second satellite. Upon receiving the notification 912, the repository 940 may provide a communication 914. The communication 914 may be broadcast to all of the satellites (excluding first satellite 910). The communication 914 may contain information about the satellites that are actively connected to the personal network. In one embodiment, communication 904 and 914 are substantially similar, except they include information from the repository 940 at different times. As with communication 904, an embodiment may provide that the communication 914 is sent to the satellites that are pertinent to second satellite 920.

Figure 8:
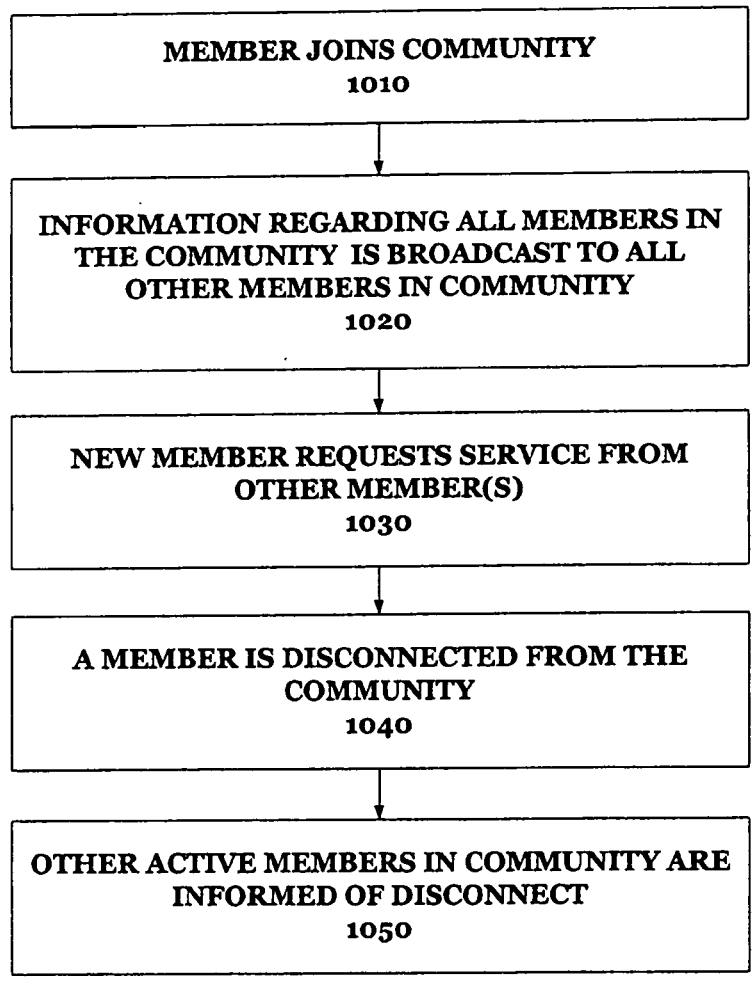
FIG. 8 is a method that illustrates how members of a community network can join and receive real-time information regarding a presence of other members in the community, for use with an embodiment of the invention.

FIG. 8 is a method that illustrates how members of a community network can join and receive real-time information regarding a presence of other members in the community. An example of the community referenced herein includes a personal network. An example of an application of such a method is the participation of any satellites 910, 920, 930 in the personal network described with FIGS. 9A and 9B.

In step 1010, a member joins the community. In joining the network, a central location (such as repository 940 in FIGS. 9A and 9B) is provided information about the new member. This information may be provided by the new joining member. The information may include instructions that other members in the community can use to communicate with the new joining member. The event of the member joining the community may occur automatically when the member is activated. For example, each of the satellites 910, 920, 930 (see FIGS. 9A and 9B) may include instructions that cause that satellite to automatically seek out and join a designated community or personal network whenever a device of that satellite is turned on. Alternatively, the member may be directed to the personal network manually, or on the occurrence of some event such as a schedule or alarm. Depending on the capabilities of the member, the member may seek out the personal network over the Internet, a LAN, home network, cellular network or other data-carrying network.

Once the member joins the community, step 1020 provides that information regarding all members in the community at that particular instance is broadcast to all other members in the community. In an embodiment, the information may be determined from a structure such as repository 940. Since the community may extend across numerous types of networks (e.g. LAN and Internet), the broadcast may be made so that it can be transmitted across various types of networks. In one implementation, a hypertext transfer protocol (HTTP) message is transmitted, with the root path of the message specifying the network (Internet, LAN etc.) on which the recipient is connected. The newly joined member also receives the broadcast. In an embodiment, each member retains information from the broadcast about other members in the community that are pertinent to that member.

After joining the community, step 1030 provides that the new member may request a service from the other members. The new member may maintain a list of other members in the community that are pertinent to it. The list may include specific capabilities or services offered by other members, and instructions for communicating with each pertinent member. The list may also provide a location of each pertinent member. The service that is requested may be in response to an action that is to be performed or has been performed by the new member. For example, a user may request an action to be performed that requires the cooperation of another member. In one application, a user may request to view a set of digital pictures using a photo-editor service. While using the photo-editor service, the user may request another service to print select pictures at a remote site. As an alternative, the new member may provide access to another service provided by another member at a different location. For example, the user may request a digital video recorder to record a television program from the user's office.

After use, step 1040 provides that the member may also be disconnected from the community. For example, the member may correspond to a particular service that runs on a user's work station. When the user leaves work and logs-off, the particular member may disconnect from the remainder of the personal network, which may include elements from the user's home network. According to an embodiment, a member disconnects by first sending a request to a central location (such as the repository 9240 in FIGS. 9A and 9B). The request is processed from the central location.

In response to processing the request, step 1050 provides that the other active members in the community are informed of the member that disconnected. In one embodiment, a broadcast is sent to the active members. The broadcast simply includes a list of the active members (as well as their capabilities, location and other information). The other members receive the broadcast and reset their understanding of the other members in the community.

Figure 9:
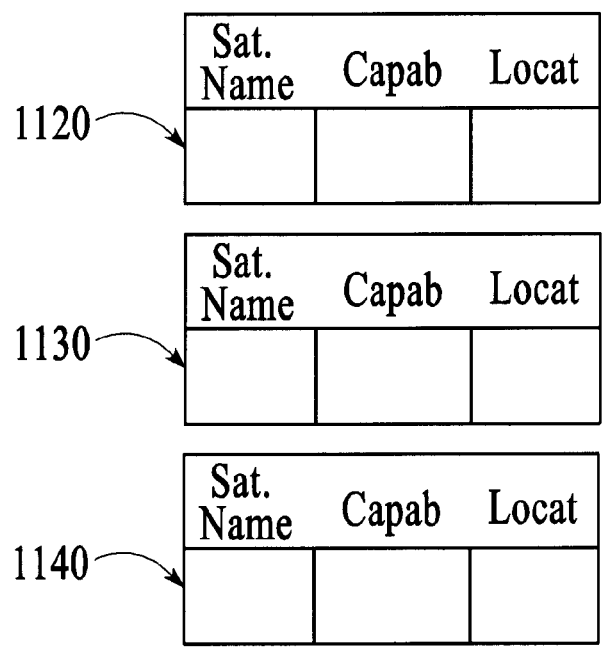
FIG. 9 illustrates data structures that can be used to provide information to satellites about other members in the personal network, for use with an embodiment of the invention.

FIG. 9 illustrates data structures that can be used to provide information to satellites about other members in the personal network, according to an embodiment of the invention. In FIG. 9, a repository 1110 (may correspond to repository 840 in FIG. 8) shares data with data structures 1120, 1130 and 1140 (which may correspond to the data structures 814, 824, 834 of respective satellites in FIG. 8). As mentioned, the repository 1110 maintains a master list of the satellites and other elements of the personal network, while the respective data structures maintain subsets of the master list. In an embodiment, the data structures 1120, 1130, and 1140 are each maintained in association with one or more corresponding satellites. While FIG. 9 illustrates use of separate data structures for individual satellites, it is possible for satellites that reside at a common location, or on a common device to share a common data structure. It is also possible for satellites that are closely integrated (such as executable on a shared platform) but on different platforms to share a common data structure.

In an example provided by FIG. 9, each of the repository 1110 and the data structures 1120, 1130 and 1140 are structured as tables. With respect to repository 1110, there is a first column 1112 containing identifiers to individual satellites and other members of the personal network. While satellites 1112 may correspond to services that run on a user of the personal network's device or resource, elements identified in the first column 1112 may also include third-party services offered over public networks. Examples of such networks include POP Internet email accounts, YAHOO! PHOTOS and BRIEFCASE, online music services (APPLE iTUNES) and public file sharing networks. At least with respect to satellites, a second column 1114 may be provided in which a capability of the satellite is provided. While the contents of second column 1114 (or other columns) may be in code, the code may also be descriptive to an administrator. One type of capability listed in the column 1114 may be a service that can be performed by the satellite. The service may be described as a list of functions or operations. Another type of capability listed in the column 1114 may provide considerations or aspects on the satellite and/or the device on which the satellite resides on. This information may be listed explicitly, or implicitly via reference to a library. In addition to the capabilities, other information such as the location of the satellite may be provided in a third column 1116. Other columns may be added as needed. As illustrated by the preceding, the acquisition of profile information may be extended to activities monitored and data stored on remote devices and resources (e.g. such as Internet accounts).

The capabilities listed in second column 1114 may be processed by other satellites who wish to use the particular satellite being described. In one embodiment, the information provided in the repository 1110, and with the second column 1114 in particular, are provided as a natural language code. The natural language code presents code with syntax and semantics that correlate to a natural language, such as English. For example, a natural English code facilitates users to view and edit the repository 1110. The natural language code may be created so as to not discriminate between devices, platforms, and/or operating systems.

In FIG. 9, three examples of satellites are described in repository 1110. A first satellite in the repository 1110 is for a printer driver. The printer driver may be for an associated printer that is connected on the personal network. The service described in second column 1114 for the printer driver is "display". The location of the printer driver in the third column 1116 may be provided in the form of a LAN address. A second satellite in the repository 1110 is for a photo server. The service described for the photo server is to retrieve (locate and copy) photo files. The location of the photo server may correspond to the same LAN address as the printer server, as both satellites may be located on a common computer in the personal network. In an example provided, a third satellite in the repository 1110 may be for a media player. The service described is to playback media. The location of the third satellite may coincide with the location of the other satellites.

In an embodiment, the data structures 1120, 1130, 1140 list rows from the repository 1110 that are pertinent to the particular satellite associated with the respective data structure. Non-pertinent satellites (those providing services that will never be used by a given satellite such as the image capturing device) may be omitted from the data structure of the given satellite. With respect to the first data structure 1120 for the first satellite, the rows listed may include the photo server, as the printer driver may need the photo server to locate a particular file. With respect to the second data structure 1130 for the second satellite, the printer driver and the media player may both be pertinent satellites, as the media player may be used to display images, provided by the photo server. The third data structure 1140 may list the photo server as a relevant service.

A video recorder, that for example, is used as a satellite may thud declare its capabilities and know the status of each pertinent satellite. Likewise, the status of the video recorder or other image capturing device may be known to each satellite in the personal network. Should the video recorder become disabled (e.g. rain storm, out of memory etc.), others satellites in the personal network that are pertinent to it will receive notification or knowledge. Thus, for example, the user's cell phone may know when the image capturing device becomes disabled.

Remote Control of Components

Figure 10A:
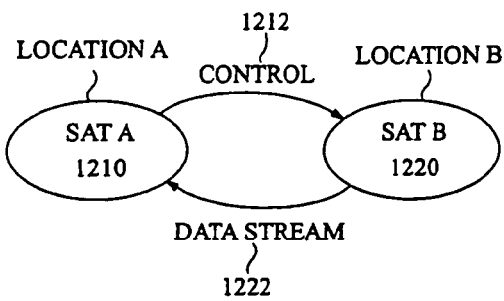
FIG. 10A illustrates a system for enabling one satellite to remotely control another satellite, under an embodiment.
Figure 10B:
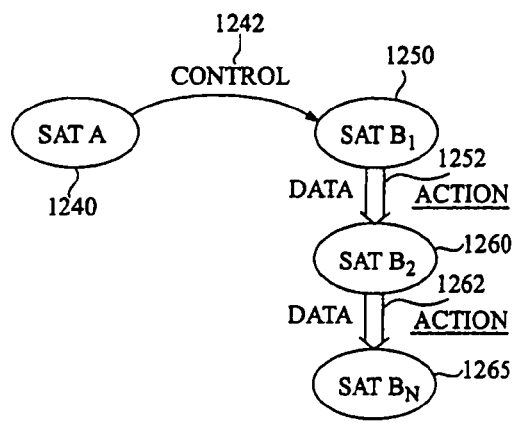
FIG. 10B illustrates a system for enabling one satellite to remotely control the use of data amongst a series of satellites, under another embodiment.
Figure 10C:
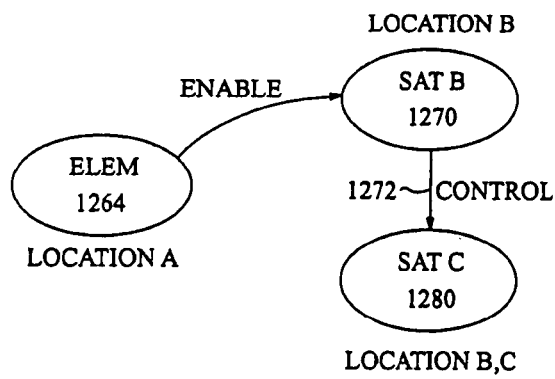
FIG. 10C illustrates a system for enabling one satellite to remotely control the application and use of data between two satellites in tandem, under an embodiment.

FIGS. 10A-10C illustrate different control applications in which one component u may control other components through the connectivity of a personal network. In one embodiment, satellites on a personal network may be configured so that a first satellite can control a second satellite, even if the first and second satellites are remotely located from one another. Since each satellite contains an API or interface (see FIGS. 2A and 2B), each satellite can receive and process communications from other satellites. According to embodiments such as shown in FIGS. 10A-10C, one satellite can control another satellite using communications that pass over the personal network, regardless of the connectivity medium that connects that satellite to the personal network. Embodiments such as described below also provide that satellites can communicate and control/be controlled by other satellites, even if the other satellite has a different operating system, different platform and/or a different usage.

In FIG. 10A, a system is shown in which a first satellite 1210 causes another satellite 1220 to perform one or more operations. The first satellite 1210 may send control signals 1212 to the second satellite 1220. The control signals 1212 may be based on user-commands received on the first satellite. Data 1222 resulting from the second satellite 1220 performing the operations is streamed to the first satellite 1210. Thus, the second satellite 1220 may perform the operations, while the first satellite 1210 receives a resulting data stream 1222 from the second satellite's operations.

It is also possible for a non-satellite or quasi-satellite component to use the personal network to control other satellites and components. For example, a cellular device, with limited processing and memory resources, may be used to connect to and cause the playback of media files through a user's personal network. Data resulting from the playback may be streamed to the cell phone, so that the cell phone can reproduce the audio and media of the file. However, the playback of the source media file occurs at the location of the second satellite 1220. In the context of media playback, the terminal that is controlled to perform the original playback may alternatively be referred to as the originating terminal, while the other terminal is referred to as the receiving terminal. In an example provided, the second satellite may correspond to a media station or personal computer, which are systems that can access a very large media library. The cell phone is an example of a receiving terminal that has more limited access to a media library, because the cell phone may not have the same bandwidth resources, memory, or audio playback resources as the personal computer or media station. An embodiment such as described enables the cell phone to borrow the media library from another device or system. Furthermore, second satellite 1220 may know of the capabilities of the cell phone, and thus be able to stream data to the cell phone in a manner that allows audio output to occur on the cell phone. For example, the rate at which data is streamed may be configured to suite the bandwidth and/or processing resources of the cell phone. As an example, a full media output operation may be performed on the second satellite 1220 at the control of the cell phone, resulting in rich audio generation and possible video display. No user is needed on the second satellite 1220. But From the output of the second satellite 1220, a set of data may be streamed to the cell phone that enables the same media being played on the second satellite 1220 to be played on the cell phone. However, differences may exist in the audio generated on the cell phone, as compared to the second satellite. One difference may be that the compression used to send the set of data to the cell phone may be of a lower quality, since the cell phone may have lower graphic and audio equipment quality, processing speed, and/or bandwidth. Therefore, the quality of the audio output on the cell phone may be less than that of the second satellite.

In an embodiment, for a satellite or other component to be able to control other satellites remotely, the satellite needs to be equipped with capabilities that allow for it to be a controller. This may include the ability to process and send control signals, to process user-commands that are converted to control signals, and to receive resulting data as a result of the other satellite performing its operations. To this end, an embodiment provides that a controller satellite may be created for deployment on a personal network.

As mentioned, the result of the second satellite 1220 performing the operations commanded by the first satellite is that data is streamed from the second satellite to the first satellite. Streaming data 1222 means that the data is buffered and dispersed from the second satellite 1220 so that the data is continuously processed on the first satellite in a proper time sequence. In the case where data stream 1222 corresponds to audio and/or video media, the result is that the data stream can reproduce the audio and/or video media to replicate playback of the original media resource at the second satellite 1220. In streaming data, the second satellite 1220 buffers the data before sending it. The second satellite 1220 may initiate the stream operation, including the buffering of the data. Alternatively, the first satellite 1210 assists in performing the stream operation. Because the data is streamed, the data may be carried more efficiently and quickly, and received more richly. This compares to previous approaches to carry refresh data from an originating terminal to a recipient terminal. Refresh data usually corresponds to a snap shot of a visual presentation, such as a screen shot. When refresh and transmit operations are performed rapidly on the originating terminal, a video feel can be recreated on the recipient terminal. But this form of data sharing requires large amounts of data to be transferred, and the video feel is poor, since the refresh operations really only correspond to a series of snap shots. Also, audio data cannot be recreated with the refresh operation. The refresh and transmit operation offers little opportunity to configure the data transmission for the needs of the recipient terminal. For example, if the recipient terminal has a small screen, there is no opportunity to shrink the video media. In contrast, embodiments described herein enable the originating terminal (where second satellite 1220 resides) to configure the data stream for the recipient (cell phone or first satellite).

In addition to playback of audio or video files, other examples of applications for an embodiment such as shown in FIG. 10A include the following. The second satellite 1120 may receive live media, in the form of cable or satellite feeds. The first satellite 1210 may control the second satellite 1220, and other satellites as well, in directing the second satellite to forward data from the live feed to the first satellite, where it can be replicated. Additional description of such an embodiment is provided below. The second satellite 1220 may also correspond to an application that generates a document, such as a word processor. The control signals 1212 may initiate the second satellite 1220 to execute, thereby opening the document and streaming it (or portions thereof) to the first satellite.

The control signals 1212 may also be used to manipulate an operation of the second satellite 1220. For example, a user may interact with the first satellite 1210 in order to send a signal to the second satellite 1220 to manipulate a play-list, by for example, skipping a song or repeating it. As another example, the user may also interact with the first satellite 1210 in order to control edits or input into a document handled by the second satellite 1220.

While an embodiment shown in FIG. 10A illustrates data 1222 being streamed from the second satellite 1220 to the first satellite 1210, another embodiment provides that the data 1222 can be streamed to a third location, either instead of or concurrently with streaming the data to the first location. Thus, for example, first satellite 1210 can direct second satellite 1220 to stream data to a web-site, a roaming device or other location accessible to the personal network.

FIG. 10B illustrates an extension of a concept illustrated in FIG. 10A. In FIG. 10B, one satellite controls multiple satellites. In one embodiment, the satellites correspond to multiple applications, which may or may not reside at the same location. In an example provided by FIG. 10B, a first satellite 1240 is provided at a first location. A second satellite 1250 is provided at a second location, and a third satellite 1260 is provided at a third location that may or may not correspond to the second location. In an embodiment, the first satellite 1240 is configured to use control signals 1242 to control the second satellite 1250 and the third satellite 1260 independently of one another. Still further, an embodiment provides that an action 1262 of the third satellite 1260 that is controlled by the first satellite 1240 is conditioned on a corresponding action 1252 that is to be performed of the second satellite. The first satellite 1240 may control the second satellite to perform the action 1252, and the action 1252 may be used by the first satellite 1240 in causing the third satellite to perform the action 1262. The manner in which multiple satellites may be controlled from a common satellite in a cascaded or serial fashion may be extended to multiple satellites.

One application for an embodiment such as shown in FIG. 10B includes a roaming device (first satellite 1240) that connects to a personal network and direct a text document application (second satellite 1250) to retrieve a specified document. The text document application may correspond to a word application, a web-based text content retrieval application, or an email application. A user-input may specify, for example, what document is to be retrieved. Once the document is retrieved (action 1252), the document may be used by a text-audio application (third satellite 1260) to generate an audio output (action 1262) based on the contents of the document. The audio may be outputted at the location of the third satellite, or alternatively streamed to the location of the first satellite 1240. Still further, the audio may be streamed to a third or fourth one or more additional satellites 1265. A user may, for example, use his cell phone to direct a server on the personal network to retrieve a news item from the web. The cell phone may direct the server to send the document to a text-audio application, which then can convert the document into an audio file. The audio file may then be streamed back to the cell phone. Alternatively, the user may select another device to receive the audio file. For example, the user may use his cell phone to direct the audio file to be delivered from the text-audio application to a connected radio player in the user's car.

In embodiments such as shown in FIGS. 10A-10C, the controlling satellite may be able to control the other satellites despite the satellites being heterogeneous. For example, in FIG. 10B, the first satellite 1240 may operate on a device having one type of platform or operating system, while the second satellite operates on a second device having another platform or operating system.

FIG. 10C illustrates another embodiment in which an element 1266 of a personal network creates, designates, or otherwise enables a first satellite 1270 to send control signals 1272 to a second satellite 1280. In an embodiment, the element 1266 may correspond to a web-service, a browser-enabled device, or another satellite. For example, a user of the personal network may access the first satellite 1270 using a centralized web-service where users can establish their personal networks. A sever or other machine may seek out the first satellite 1270 in order to enable that satellite to have control over the second satellite 1280. Once controller and controlled satellites are established, a system may operate in a manner such as described with FIGS. 10A and 10B.

Application of satellites that can remote control one another has particular significance to embodiments such as described in FIGS. 1-5. As mentioned, the video recorder may be established as a satellite that can communicate with another satellite, such as the media station or a controller residing on the media station. In one embodiment, the user can direct the media station to control the image recording device using another component of the personal network, including for example, the cell phone or web-service. The result is that the user may change, for example, the notification settings of the media station, the camera settings, or other functions. The user may also control the flow of image data from the image capturing device. For example, the user may direct the media station to forward data to a digital video recorder, using a cell phone or webservice. Numerous other variations are possible as well.

Transducer

Figure 11:
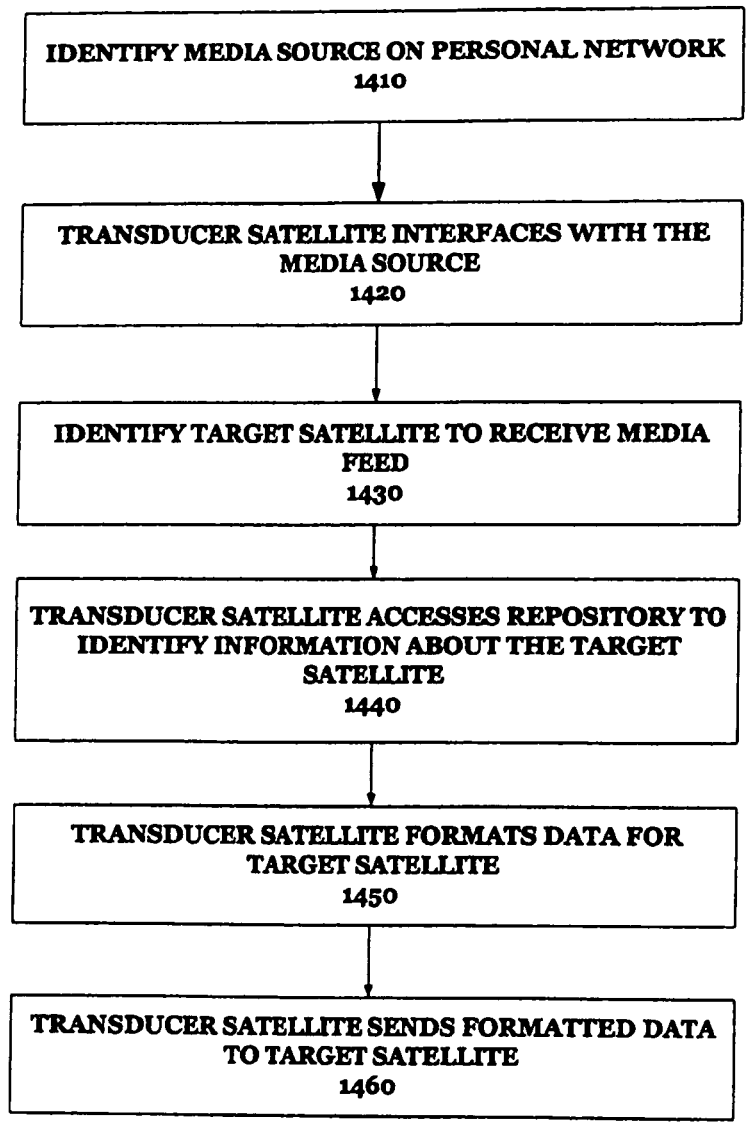
FIG. 11 illustrates a method for implementing a transducer on a personal network in order to transmit content to various kinds of devices, under an embodiment.

FIG. 11 illustrates an embodiment in which a satellite is provided on a personal network in order to provide a transducer service. The transducer service redirects streaming data that is sent to one location over to a designated satellite. A transducer service may be implemented on a media source such as video data captured by a video recorder (as described in FIGS. 1-5).

In step 1410, a media source on a personal network from which streaming media can be obtained is identified. The source of the streaming media may be assumed to be the image capturing device, directed over a monitored scene.

In step 1420, a transducer satellite interfaces with the media source. The transducer satellite may either interface with the media source directly, or interface with another satellite that provides the transducer satellite streaming media from the media source (see embodiments described with FIGS. 10A-10C).

In step 1430, the transducer satellite identifies a target satellite to receive the media feed. The target satellite may reside on a device, such as a roaming device. The identification of the target satellite may be specified by the user, such as the case where the user is operating the intended target device.

In step 1440, the transducer satellite accesses a repository (e.g. element 840 in FIG. 6) of the personal network in order to determine the capabilities of the target satellite, including the amount of data it can receive, and any information about the device that corresponds to the target satellite. The repository may make reference or contain a library with information that includes a data rate that the target satellite can handle (based on processing speed or bandwidth to the target), a display size or a display resolution. Other pertinent information about the device or platform of the target satellite may also be used.

In step 1450, the transducer satellite formats or otherwise prepares the data from the media source for the target satellite, based on the information it obtains about the device. For cell phone devices, as an example, the transducer satellite may reduce the resolution and format the streaming data to accommodate the specific display size of the target satellite or its device. In many cases, the transducer may also take no action, as the target satellite may have full capability to receive the stream with no modifications.

Step 1460 provides that the formatted data (if any) is streamed to the target satellite. The formatting of the media enables media resources from various sources, including from image capturing device when directed over a scene (e.g. see FIGS. 1-5), to be formatted and delivered for instant playback on virtually any kind of recipient terminal, such as, for example, cell phones.

Thus, with respect to an image capturing device directed over a scene to capture video, an embodiment provides that numerous end devices capable of receiving data can also be configured to receive the stream from the user. The user may not need to perform any action other than to specify one time what type of device is being used. Any formatting or configuration that needs to be done to the media stream may then be performed at any time a request to send data to the particular device is received.

Conclusion

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for operating a computing device of a user, the method being implemented using one or more processors and comprising:
   receiving image data from an image capturing component, wherein the image data represents one or more images of a monitored scene;
   providing a link to a target device;
   detecting selection of the link on the target device;
   in response to detecting selection of the link, configuring the received image data for the target device, and streaming the configured image data from the computing device to the target device over one or more networks.

2. The method of claim 1, wherein configuring the image data includes reducing a resolution of the image data received from the image capturing device.

3. The method of claim 1, wherein configuring the image data includes reducing a frame rate of a video received from the image capturing device.

4. The method of claim 1, wherein configuring the image data includes converting a video received from the image capturing device to one or more still images.

5. The method of claim 1, wherein providing a link to a target device includes generating a message for the target device, and including the link in the message.

6. The method of claim 1, further comprising analyzing the image data received from the image capturing device in order to determine when the scene changes, and wherein providing the link to the target device includes generating a communication that includes the link in response to determining that the scene has changed.

7. The method of claim 1, wherein streaming the configured image data to the target device is performed while the computing device receives the image data from the image capturing device.

8. The method of claim 1, wherein providing the link to the target device is performed in response to a request communicated from the target device.

9. The method of claim 1, wherein the target device is external to a personal network that includes the computing device.

10. The method of claim 1, wherein the target device is a roaming device.

11. A computer system comprising:
    a memory that stores a set of instructions;
    one or more processors that execute the instructions to:
       receive image data from an image capturing component, wherein the image data represents one or more images of a monitored scene;
       provide a link to a target device;
       detect selection of the link on the target device;
       in response to detecting selection of the link, configure the image data for the target device, and stream the configured image data from the computing device to the target device over one or more networks.

12. The computer system of claim 11, wherein the one or more processors configure the image data by reducing a resolution of the image data received from the image capturing device.

13. The computer system of claim 11, wherein the one or more processors configure the image data by reducing a frame rate of a video received from the image capturing device.

14. The computer system of claim 11, wherein the one or more processors configure the image data by converting a video received from the image capturing device to one or more still images.

15. The computer system of claim 11, wherein the one or more processors provide the link to the target device by generating a message for the target device that includes the link.

16. The computer system of claim 11, wherein the one or more processors execute instructions from the set of instructions to analyze the image data received from the image capturing device in order to determine when the scene changes, and wherein the one or more processors provide the link to the target device by generating a communication that includes the link in response to determining that the scene has changed.

17. The computer system of claim 11, wherein the one or more processors stream the configured image data to the target device while the computer system receives the image data from the image capturing device.

18. The computer system of claim 11, wherein the one or more processors provide the link to the target device in response to a request communicated from the target device.

19. The computer system of claim 11, wherein the target device is external to a personal network that includes the computer system.

20. The computer system of claim 11, wherein the target device is a roaming device.

21. A non-transitory computer-readable medium that stores instructions, that when executed by one or more processors of a computing device, causes the computing device to perform operations comprising:
    receiving image data from an image capturing component, wherein the image data represents one or more images of a monitored scene;
    providing a link to a target device;
    detecting selection of the link on the target device;
    in response to detecting selection of the link, configuring the image data for the target device, and streaming the configured image data from the computing device to the target device over one or more networks.

22. The non-transitory computer-readable medium of claim 21, wherein configuring the image data includes reducing a resolution of the image data received from the image capturing device.

23. The non-transitory computer-readable medium of claim 21, wherein configuring the image data includes reducing a frame rate of a video received from the image capturing device.

24. The non-transitory computer-readable medium of claim 21, wherein configuring the image data includes converting a video received from the image capturing device to one or more still images.

25. The non-transitory computer-readable medium of claim 21, wherein providing a link to a target device includes generating a message for the target device, and including the link in the message.

26. The non-transitory computer-readable medium of claim 21, further comprising instructions that, when executed by the one or more processors, cause the computing device to perform operations that comprise:
    analyzing the image data received from the image capturing device in order to determine when the scene changes, and
    wherein providing the link to the target device includes generating a communication that includes the link in response to determining that the scene has changed.

27. The non-transitory computer-readable medium of claim 21, wherein streaming the configured image data to the target device is performed while the computing device receives the image data from the image capturing device.

28. The non-transitory computer-readable medium of claim 21, wherein providing the link to the target device is performed in response to a request communicated from the target device.

29. The non-transitory computer-readable medium of claim 21, wherein the target device is external to a personal network that includes the computing device.

30. The non-transitory computer-readable medium of claim 21, wherein the target device is a roaming device.

\* \* \* \* \*